C. L. NORTON.
COMPOSITION FOR PRODUCING REFRACTORY MATERIAL.
APPLICATION FILED JULY 6, 1908.
929,003.
Patented July 27, 1909.
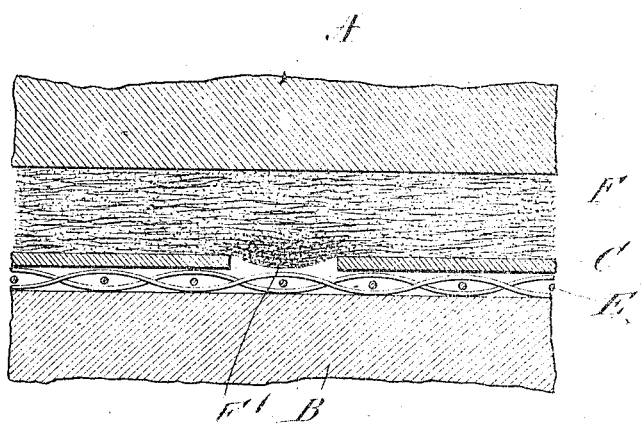
WITNESSES:
INVENTOR:
Charles L. Norton
by
Roberts & Cushman
Attorneys

UNITED STATES PATENT OFFICE.

CHARLES LADD NORTON, OF MANCHESTER, MASSACHUSETTS.

COMPOSITION FOR PRODUCING REFRACTORY MATERIAL.

No. 929,003.    Specification of Letters Patent.    Patented July 27, 1909.

Application filed July 6, 1908. Serial No. 442,043.

*To all whom it may concern:*

Be it known that I, CHARLES LADD NORTON, a citizen of the United States, and resident of Manchester, in the county of Essex and State of Massachusetts, have invented new and useful Improvements in Composition for Producing Refractory Material, of which the following is a specification.

My invention relates to the production of refractory materials such as are described in Letters Patent of the United States, No. 847,293, granted to me under date of March 12, 1907, and consists in specific improvements in the composition of matter by which the production of such refractory materials is expedited and facilitated.

Where, as in the case of the refractory material described in my patent aforesaid, the ingredients which are subjected to pressure (namely, the fibers, the cementitious material and the liquid) are placed in a filter press, the filtration of the surplus liquid from the mixture must be effectuated in such manner that the liquid expressed may not carry with it too much of the cementitious material, which, to perform its function properly, must remain in the body of the material together with a sufficient residual quantity of water to effect the setting of the cement. Consequently, if filtering material on a filter bed is relied upon to retain the finely comminuted cementitious material, the mesh thereof must be extremely fine, in most cases as fine as bolting cloth, if its functions are to be thoroughly performed.

While the employment of fine textile filtering material is mechanically feasible and effective to produce slabs or sheets of refractory material of the general character above indicated, yet such filtering webs are undesirable in a continuous series of operations, principally for the reason that they very soon become impregnated with cementitious material which sets in the mesh and thereafter renders the filter useless, and also because such filter-webs are fragile and ill suited to sustain heavy pressures, even though carefully supported.

My invention in its broader aspect, is characterized by the formation of a mixture of the essential ingredients, namely:—fibers, solid or semi-solid cementitious material and a suitable liquid, of such character and consistency that, when a mass of such mixture is spread upon a perforated metal screen, the fibers of the mixture will, by interlacing and felting automatically and of themselves, form filtration webs over and across relatively large perforations in a filter sheet, so that those foundation fibers themselves furnish a filter web of fineness sufficient to retain within the body of the material the cementitious material, while allowing surplus liquid to be expressed. In properly compounded mixtures constituted principally of asbestos fibers (even those very short fibers produced by the grinding of serpentine rock) these foundation fibers of the mixture form an effective retaining filtration web over apertures in a perforated metal sheet 1/16" in diameter.

The physical condition essential to the performance of this function by the fibers in the mass under treatment is that the proportion of liquid in the material shall be less than that which would produce mobility of the fibers in the liquid. If too much liquid is employed so that the fibrous ingredients of the material float about in it, as soon as the mixture is placed upon a filter bed provided only with a perforated metal sheet, the fibers themselves and a large portion of the cementitious material escape through the perforations, thus depriving the mixture of part of a very essential ingredient, for the reason that the cementitious material is usually very finely comminuted. Again, if the cementitious material with or without a portion of the fiber escapes through the mesh or perforation in the filter bed, the spaces in the filter bed soon become clogged and, as the cementitious material sets, the functional utility of the filter bed is destroyed, and if it be used in a hydraulic press the filtration sheets and webs become firmly cemented to the head of the press, from which they can be removed only with great difficulty. It is hardly necessary to state that, while the proportion of the liquid in the material should be less than that which will produce mobility of the fibers therein, it should be at least sufficient for the purpose of combination with the cementitious material. This condition, however, is very easily secured without danger of exceeding the proper maximum limit.

In the drawing hereto annexed there is illustrated conventionally in part and on a very much enlarged scale, a portion of a filter press and its bed showing the characteristic behavior of a self-filtering composition which embodies my invention.

In its broader aspects, the self-filtering composition herein illustrated, is set forth and reserved for claim in an application for Letters Patent filed by me concurrently herewith, serially numbered 442,042, and likewise, the filtration process, whereof the description is involved herein, is described and reserved for claim in another application for Letters Patent filed concurrently herewith, serially numbered 442,044.

In the formation of a composite matter, of the general character set forth in my patent aforesaid, but specifically in such proportions as will enable it to perform the self-filtering function above described, I proceed as follows: First I mix in a dry state, from 2½ to 3 parts by weight of asbestiform fiber with 1 part by weight of magnesium oxid, the latter being preferably procured by calcination of finely divided magnesium carbonate as set forth in my said patent. Then 1 part by weight of this mixture of asbestiform fiber and magnesium oxid is mixed with 2 parts by weight of water. These proportions are correct provided the solids are thoroughly dry; if they have lain for any length of time in a moist atmosphere, water absorbed from the air must be taken account of. This mixture is then placed upon the filter bed of the filter press.

Referring to the drawings;—A and B represent the upper and lower press heads or press plates. Upon the press plate there is laid a sheet of woven wire E and over this is a sheet of perforated metal C. The perforations in this sheet C should be close together and preferably quite small, though they may, without impairing the success of the process, be as large as 1/16" in diameter. Smaller perforations, even as small as 1/64" are, however preferable for the reason that by use of smaller perforations the lower surface of the finished compressed product is more nearly plane than it is when larger perforations are employed.

Practice and experience with the particular mixture of materials used as ingredients of the article of manufacture produced, will determine more exactly the proper diameter and spacing of the apertures in the top of the filter bed. The object to be attained is the formation of webs or nets composed of the fibers which form an ingredient of the material, over and across the perforations in the filter bed sheet, and the preservation of these webs during the compression stage of the process so that, while surplus liquid will pass through the self-formed webs of fiber, the cementitious material will be retained within the body of the article produced.

Referring again to the drawings, F represents the fibers in the mass under pressure, and the dots (not lettered) represent the particles of cementitious material. When this mixture as above described is spread upon the filter bed and subjected to pressure between the plates A and B, simultaneously with the initial flow of liquid through the apertures in the perforated sheet C the foundation fibers mat together and form a web as at F' stretched across the apertures in the sheet C. This web possesses sufficient tensile strength to retain its integrity even though the pressure between the press plates A and B exceeds one ton to the square inch. These webs of the foundation fibers retain the cementitious material, while allowing surplus water to escape. When after the compressed sheet or slab is removed from the press, it is examined closely, the lower surface of it will be found covered with slight protuberances, showing where the retaining webs of the foundation fibers have sagged slightly into the apertures of the top sheet of the filter bed, and it has also been observed in many instances that the cementitious material is more dense immediately behind these little protuberances than elsewhere in the body of the finished article. This apparently demonstrates the tendency of the finely comminuted cementitious material to flow toward the apertures and to escape from the body of the mixture under pressure and also demonstrates the effectiveness of the self-formed webs of foundation fiber to prevent the escape of the cementitious material from the body of the mixture.

The correct manipulation and adjustment of the proportion of water mechanically added must be learned by experience and checked by observation. The quality of the wet mush and also the behavior of the mixture in the press will serve as check upon the operation of the water addition. Too little water will cause the compressed sheets or plates to adhere too intimately to the press head and too much water will manifest its excess by the quality of the liquid which flows from the press. The expressed liquid should run from the press nearly clear; if it is milky, then it is certain that too much water is being added to the material in the preparation for the press. A slight milkiness or cloudiness of the water which first emerges from the press will always be observed but it is of no consequence. It is the subsequent flow of which the character serves as a detector of an excess of water in the mixture. Conversely, the character of the waste-water from the press for the same reason will betray errors in mixing the dry solid ingredients, if these involve too scant proportions of fiber, the mobility of the fibers in the liquid added will allow fiber and cement to pour through the fiber-perforations, and the expressed liquid will flow cloudy throughout the operation.

The mixed mass in the press is subjected to a pressure, preferably of one ton or more to the square inch. The foundation fibers, as illustrated in the drawing, form retaining webs over the perforations in the upper sheet of the filter bed and retain the magnesium oxid in the body of the article produced and insure the cementation of substantially the entire quantity of magnesium oxid originally incorporated in the mixture.

I claim:

1. A self-filtering composition consisting of asbestiform fibers, magnesium oxid, and water, in proportions, by weight, of 1 part magnesium oxid, 2½ to 3 parts asbestiform fiber, and six to seven parts water.

2. A self-filtering composition consisting of asbestiform fiber, magnesium oxid, and water, the proportion of water being less than that productive of mobility of the fibers therein.

Signed by me at Boston, Massachusetts, this fifteenth day of June 1908.

CHARLES LADD NORTON.

Witnesses:
CHARLES D. WOODBERRY,
JOSEPHINE H. RYAN.